UNITED STATES PATENT OFFICE

ABRAHAM S. BEHRMAN, OF CHICAGO, ILLINOIS, ASSIGNOR, BY MESNE ASSIGNMENTS, TO THE PERMUTIT COMPANY, OF NEW YORK, N. Y., A CORPORATION OF DELAWARE

BASE EXCHANGE MATERIAL AND PROCESS OF MAKING SAME

No Drawing.     Application filed March 21, 1924. Serial No. 700,822.

The present invention relates to the production of metallo-silicates, and has particular value in the preparation of base exchange materials, or zeolites, useful in the process of softening water, wherein the sodium or potassium of a zeolitic compound is released in exchange for the calcium and magnesium in hard water brought into contact with the zeolites, the sodium or potassium being subsequently restored by treating the zeolites with a suitable salt solution.

According to prior practice, artificially prepared zeolites were produced generally by one of two methods, viz., sintering or fusing the constituent elements, or by combining them in the form of a precipitate by the reaction of suitable solutions. It is to the latter, commonly classified as the wet method, that the present invention relates.

In my co-pending application for Letters Patent, Serial No. 667,416 filed October 8, 1923, Patent No. 1,515,007, I have prescribed a new and improved method of preparing zeolites by the wet method, which comprises mixing a non-alkaline solution of an amphoteric oxide or hydroxide such as solutions of aluminum, iron, chromium, zinc, etc. oxides or hydroxides with a solution of an alkali metal silicate, in such proportions and degree of concentration that the resulting precipitate forms a gel occupying the entire volume of the reacting solution, there being no separation of mother liquor. By the improved method an end product of greatly superior technical value is obtained.

Further development of the conception underlying the disclosure of the aforesaid application has disclosed that base exchange materials still further improved may be obtained by increasing the silica content of the end product of the reaction, and that this increase may be accomplished in a simple and effective manner. Such increase in silica content and the method of accomplishing it may be said to be the principal feature and object of the present invention.

By increasing the silica or silicic acid content of the base exchange materials formed by the reaction referred to they will have far greater density, will be much harder and better adapted for technical use than those formed as a result of what might be said to be normal reactions of the solutions involved.

Heretofore in accordance with the various processes of preparing base exchange materials by the wet method, alkali metal oxide, amphoteric oxide and silica have been present in the end product in the approximate ratio of 1:1:4 (that is, either the alkali metal oxide or the amphoteric metal oxide bear a ratio to the silica of about 1 to 4). I have found that if this ratio can be changed so that the alkali metal oxide or the amphoteric oxide bears a ratio to silica of 1:10, or less, the end product will possess a high degree of base exchange capacity and will be better suited for use than a material in which the silica content is less predominant.

I have found that an effective and desirable way of increasing the silica content of base exchange materials formed by the reaction of solutions of an alkali metal silicate and a soluble salt of an amphoteric metal oxide or hydroxide is by the liberation of silicic acid and that this will result from the addition of an acid. Although sulphuric acid is a specific acid given as an example, it is obvious that other acids which are capable of removing sodium oxide from its combination with silicic acid may be utilized. This acid should preferably be of such a character that it may be mixed with the solution of the amphoteric metal compound or salt and not result in the precipitation of an amphoteric metal compound and it should desirably form a soluble salt with the sodium oxide of the silicate, which may be readily washed out of the final base exchange silicate. Sufficient of the acid should be added to reduce the metal oxide content and increase the silica content. The acid preferably is so proportioned that the silica content of the resultant gel will be much more (for example about 2½ times or more) that which would have resulted had the solution of amphoteric metal compound and the sodium silicate have been reacted without such additions. In general, any acid stronger than silicic may be utilized for this purpose. The acid may be added at any stage of the process and preferably is added to one of the solutions prior to mixing, or at the time of mixing. In a preferred embodiment of the invention, the acid, (e. g., sulphuric acid), is added to the solution of the amphoteric metal compound (e. g., aluminum sulphate) and this combined solution is then mixed with a solution of an alkali metal silicate (e. g., sodium silicate).

I shall now disclose what I consider to be the preferred method of procedure in accordance with the present invention, and shall cite two examples, using different proportions of the ingredients, as an indication of the wide latitude permissible within the purview of the invention. I do not specify these examples as the limit of accomplishment in either direction, nor do I wish to be understood as indicating that the proportions of the materials may not be otherwise modified, or that the temperatures, degrees of concentration, times of treatment and other incidentals may not be altered within the scope and comprehension of this invention as defined in the accompanying claims.

In the first example I add 290 c. c. of concentrated sulphuric acid containing about 519 grams $H_2SO_4$ (about 5.3 moles of sulphuric acid), to 3.2 liters of a solution of commercial aluminum sulphate containing about 60 grams $Al_2O_3$ and 127 grams $SO_3$ per liter (which corresponds to a total of about 1.9 moles of aluminum oxide and 5.09 moles of sulphur trioxide). I dilute this mixture to 16 liters, and after cooling, mix it intimately with 30 liters of a cooled sodium silicate solution containing 26.1 grams $Na_2O$ and 82.7 grams $SiO_2$ per liter (which corresponds to a total of about 12.6 moles of a sodium silicate of the formula

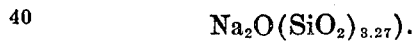
$$Na_2O(SiO_2)_{3.27}.$$

The mixture will first result in the decrease of the ratio of sodium oxide to silica in the sodium silicate by almost ½ since 5.3 moles of sulphur trioxide will combine with 5.3 of the 12.6 moles of the $Na_2O$ in the silicate leaving 7.3 moles of a silicate having the approximate formula $Na_2O(SiO_2)_{5.65}$. This polysilicate will react with the aluminum sulphate present, and the 5.09 moles of sulphur trioxide in such sulphate will reduce the amount of $Na_2O$ to the order of 2.2 moles. The 2.2 moles of sodium oxide remaining will then react with the 41.2 moles of $SiO_2$ and the 1.9 moles of aluminum oxide to form a precipitate of the base exchange silicate which will have the ratio of about 1:1:20 by moles or about 1:1.5:20 by weight. In five minutes or less a gel forms which embraces the entire volume of the reacting solutions, and in a short time sets to a stiff, firm and almost leathery mass. After it is well set, the gel is dried at a temperature below 100° C. preferably at about 80° C. In drying, the mass shrinks into small, hard, opaque lumps. The drying is continued until the material is bone dry. Upon wetting with water these dried particles will decrepitate into smaller particles of suitable size for use in the softening of water. The particles can be made still smaller by crushing. An effective way of reducing the dried product to fine granular particles is by heating to about 100° C. and then immediately subjecting them to treatment with cold water. If for any reason somewhat larger particles are desired, these may be obtained by wetting the dried product with steam instead of water.

During the reaction a large amount of sodium salts is formed, the sodium sulphate resulting from the addition of the sulphuric acid being an addition to the sodium salts formed by the action of the aluminum sulphate on the alkali metal silicate. These sodium salts which remain in the mass until after drying greatly increase the porosity of the final product. Being soluble in water they are removed by leaching. An accompanying change in the physical appearance of the particles is noted during the leaching, the particles losing their opacity and becoming glassy and transparent. These particles are extremely hard and have a resemblance to rock crystal.

Calculating on the anhydrous basis, the sodium sulphate formed in the example cited constitutes over 30 percent by weight of the total solids in the reaction mixture. In none of the prior processes has this proportion been greater than 10 percent. The removal of this salt obviously leaves the particles with a high degree of porosity and with increased surface area available for contact with liquids to be subjected to treatment in the exchange of bases.

The porosity of the material may be conveniently measured by rewetting a quantity thereof after leaching and drying, and by determining the increase in weight due to filling the pores. By this method of measurement material prepared according to the example cited will shown an increase of about 50 per cent in weight. This material retains its glassy appearance and high degree of porosity, even after exposure to high temperatures, such as 1400° F. Due to its stability and the high degree of porosity in the finished product, this material has value as an adsorbent independent of its utility in base exchanging processes.

The material prepared as in the first example will be found to have a base exchange capacity of about 200 grains calcium carbonate equivalent, per pound. Its density is between 50 and 55 pounds per cubic foot, consequently its capacity is in excess of 10,000 grains per cubic foot. It is of the quick regenerating type and is in every manner desirable for industrial purposes.

For another example I take, as before, 30 liters of a cooled sodium silicate solution containing about 26.1 grams $Na_2O$ and 82.7 grams $SiO_2$ per liter (which totals about 12.6 moles of a sodium silicate of the approximate formula $Na_2O(SiO_2)_{3.27}$). I also take 3.8 liters of a solution of aluminum sulphate containing about 60 grams $Al_2O_3$ per liter, (which will total about 2.24 moles of aluminum oxide and 6.05 moles of sulphur trioxide), add thereto 180 c. c. concentrated sulphuric acid containing about 315 grams or about 3.21 moles of $H_2SO_4$ and dilute to 16 liters. This combined solution is cooled and intimately mixed with the 30 liters of sodium silicate. The sulphuric acid will act upon the sodium silicate and remove some of the sodium oxide. After the neutralization of the 3.21 moles of sulphuric acid there will remain about 9.4 moles of a silicate of the approximate formula $Na_2O(SiO_2)_{4.38}$. This will then react with the aluminum sulphate, and after the reaction of the 6.05 moles of sulphur trioxide in the aluminum sulphate there will remain 3.3 moles of $Na_2O$. These will then combine with the 2.24 moles of aluminum oxide and 41.2 moles of silica to form a base exchange silicate having the approximate ratio of 1:1:15 by moles or 1:1:10 by weight. As in the first example, a gel forms embracing the entire volume. There is no separation or removal of the mother liquor. The gel is dried to remove all moisture and is then treated with water to effect granulation.

The particles resulting are vitreous and have great mechanical strength and porosity. The material has a base exchange capacity of from 250 to 300 grains, calcium carbonate equivalent, per pound, and a density of about 50 pounds per cubic foot. Its capacity per cubic foot is in excess of 12,500 grains. The porosity of this material is even greater than that of the material prepared in accordance with the method of the first example, showing an increase in weight of about 55 per cent by adsorption of water. The high porosity and vitreous appearance are retained notwithstanding exposure to high temperatures.

The materials resulting from the given examples of the process of this invention have greater density and capacity per pound than materials prepared according to any of the previously published or practiced wet methods of preparation. They have a greater base exchange capacity per volume of material than any other water softening agent of the base exchange type heretofore known and used.

According to the precise proportions given in the foregoing examples, the reaction mass will be alkaline to phenolphthalein. It is contemplated that the proportions employed may be varied to give a mass which will be neutral to phenolphthalein and litmus, but alkaline to methyl orange, in which case the end product will also be found to be superior to those of the prior art.

The disclosure of the present invention will suggest to those versed in the art many modifications in the steps cited in the foregoing examples. It is obvious that the ratio of amphoteric salt, acid and alkali metal silicate may be varied; that an alkali metal silicate containing any desired ratio of $Na_2O$ and $SiO_2$ may be employed; that potassium silicate is available and may be satisfactorily employed and that other equivalent amphoteric metal oxides or hydroxides such as those disclosed in the copending application Serial No. 667,416 may be used; all such variations and modifications are contemplated, and within the spirit of the following claims.

It will be noted that what actually appears to take place in the present process is a reaction of a sodium polysilicate containing more than 3.27 moles of $SiO_2$ per mole of $Na_2O$ with an aluminum sulphate. The only purpose of adding an acid is to reduce the alkali metal oxide in the reaction mixture, to which the sodium oxide is added as the trisilicate of commerce. This will in turn result in an increase of silica in the final reaction mixture, which is the result desired. Any acid which will increase the silica of the reaction mixture in proportion to the metal oxides will serve the purpose of this invention.

By the expression "polysilicate" we include any silicate containing more than one mole of silica to one mole of alkali metal oxide. The ratio of silica to alkali metal oxide may either be a whole number or a whole number plus a decimal.

I claim:

1. The process of producing a metallo-silicate which comprises mixing a solution of an alkali metal silicate, an acid and a solution of a non-alkaline compound of an amphoteric hydroxide in such volume proportions and concentration as to form a gel embracing substantially the entire volume of the mixture.

2. The process of producing a metallo-silicate which comprises mixing a solution of an alkali metal silicate, an acid and a solution of a non-alkaline compound of an amphoteric hydroxide to form a stiff firm gel of the whole, then completely drying the gel.

3. The process of producing a metallo-silicate which comprises mixing a solution of an alkali metal silicate, an acid and a solution of a non-alkaline compound of an amphoteric hydroxide to form a stiff firm gel of the whole, completely drying the gel, and then wetting it to resolve it into particles suitable for technical use.

4. The process of producing a metallo-silicate which comprises mixing a solution of an alkali metal silicate, an acid and a solution of a non-alkaline compound of an amphoteric hydroxide to form a stiff firm gel of the whole, heating the gel to completely dry the same, then wetting the heated mass to remove the soluble compounds formed during the reaction.

5. The process of producing a metallo-silicate which comprises mixing a solution of an alkali metal silicate, an acid and a solution of a non-alkaline compound of an amphoteric hydroxide to form a stiff firm gel of the whole, heating the gel to completely dry the same, then subjecting the mass to the action of steam to resolve it into particles.

6. The process of producing a metallo-silicate which comprises treating a solution of a non-alkaline compound of an amphoteric hydroxide with an acid and then mixing with a solution of an alkali metal silicate, drying the mass and then wetting it to resolve it into particles.

7. The process of producing a metallo-silicate which comprises treating a solution of aluminum sulphate with an acid and then mixing with an alkali metal silicate to form a gel, drying the gel and then leaching.

8. The process of producing a metallo-silicate which comprises mixing a solution of an alkali metal silicate, an acid and a solution of a non-alkaline compound of an amphoteric hydroxide in such proportions that the mixture will be alkaline to phenolphthalein.

9. A base exchange material formed by the reaction of a solution of alkali metal silicate, a solution of a non-alkaline compound of an amphoteric hydroxide, and an acid, in which the ratio of silica to alkali metal oxide and to amphoteric oxide is greater than 10:1:1.

10. The process of producing a metallo-silicate which comprises mixing a solution of an alkali metal silicate, a solution of a non-alkaline compound of an amphoteric hydroxide and sufficient acid to produce in the resultant gel a silica content at least twice that which would have resulted had the acidity of the amphoteric hydroxide and the acid combined been derived entirely from an equivalent quantity of the amphoteric hydroxide.

11. The process of producing a metallo-silicate which comprises mixing a solution of sodium silicate, a solution of aluminum sulphate and an acid, the acid being added in such quantity as to increase the silica content of the product.

12. A process of preparing a high silica base exchange silicate, which comprises reacting an alkali metal silicate, a soluble amphoteric metal compound and an acid and proportioning these ingredients in such a manner that the reaction mixture will contain more than 10 moles of silica to each mole of reactive alkali metal and amphoteric metal oxide present.

13. A process of preparing a high silica base exchange silicate which comprises reacting an alkali metal silicate, an amphoteric metal salt and an acid stronger than silicic acid.

14. A process of preparing a high silica base exchange silicate which comprises mixing together an alkali metal silicate, an amphoteric metal salt and an acid, the latter being of such strength and concentration as to combine with the alkali metal oxide of the alkali metal silicate and form a soluble salt which can be readily washed out of the base exchange silicate.

15. The process of preparing a base exchange silicate which comprises reacting an alkali metal silicate, an aluminum salt and a strong acid.

16. The process of preparing a base exchange silicate which comprises reacting an alkali metal silicate, an amphoteric metal salt and an acid which does not form an insoluble amphoteric metal salt.

17. A process of preparing a metallo-silicate which comprises reacting together an alkali metal silicate, a solution of a non-alkaline compound, of an amphoteric hydroxide and an acid and proportioning the amounts of these ingredients so that the soluble salts formed by the reaction will constitute over 10% by weight of the anhydrous solids.

18. The process of improving base exchange materials which comprises reacting the ingredients to form a base exchange material and introducing a sufficient amount of an acid to neutralize substantially all of the free alkali present.

In testimony whereof I have hereunto signed my name.

ABRAHAM S. BEHRMAN.

CERTIFICATE OF CORRECTION.

Patent No. 1,806,663. Granted May 26, 1931, to

ABRAHAM S. BEHRMAN.

It is hereby certified that error appears in the printed specification of the above numbered patent requiring correction as follows: Page 1, line 94, before the word "that" insert the word than; page 4, lines 71 and 72, claim 14, for the words "mixing together" read reacting; same page, line 91, claim 17, strike out the comma; and that the said Letters Patent should be read with these corrections therein that the same may conform to the record of the case in the Patent Office.

Signed and sealed this 11th day of August, A. D. 1931.

(Seal)
Wm. A. Kinnan,
Acting Commissioner of Patents.